US006132336A

United States Patent [19]

Adachi et al.

[11] Patent Number: 6,132,336

[45] Date of Patent: Oct. 17, 2000

[54] SLIP CONTROL APPARATUS FOR TORQUE CONVERTER

[75] Inventors: Kazutaka Adachi, Yokohama; Touru Urasawa, Kanagawa, both of Japan

[73] Assignee: Nissan Motor Co., Ltd., Yokohama, Japan

[21] Appl. No.: 09/146,959

[22] Filed: Sep. 4, 1998

[30] Foreign Application Priority Data

Sep. 5, 1997 [JP] Japan .................................... 9-240882

[51] Int. Cl.[7] ...................................................... B60K 41/02

[52] U.S. Cl. ............................................ 477/169; 477/176

[58] Field of Search .................................... 477/168, 169, 477/175, 176; 701/67, 68

[56] References Cited

U.S. PATENT DOCUMENTS 5,074,166 12/1991 Yamashita et al. ................... 477/45 X
5,439,428 8/1995 Slicker .................................... 477/175
5,674,155 10/1997 Otto et al. ........................... 477/169 X
5,679,099 10/1997 Kato et al. .............................. 477/176
5,719,768 2/1998 Tashiro et al. ...................... 477/169 X
5,743,828 4/1998 Kuriyama et al. ...................... 477/169

*Primary Examiner*—Charles A Marmor
*Assistant Examiner*—Roger Pang
*Attorney, Agent, or Firm*—Foley & Lardner

[57] ABSTRACT

A slip control apparatus for a torque converter with a lockup clutch controls a slip rotation speed between input and output elements of the torque converter so as to be set at a slip rotation speed command value through the control of an engagement condition of the lockup clutch. The slip control apparatus comprises a target converter torque calculating section which calculates a target converter torque for achieving the slip rotation speed command value on the basis of a characteristic of the torque converter. A target engagement capacity calculating section calculates a target engagement capacity of the lockup clutch by subtracting the target converter torque from an output torque of the engine. The lockup clutch engagement force controlling section controls an engagement force of the lockup clutch so as to adjust a lockup clutch engagement capacity of the lockup clutch at the target lockup clutch engagement capacity. This linear compensated control improves an accuracy of the torque converter slip control.

13 Claims, 9 Drawing Sheets

GEAR TRANSMISSION MECHANISM
LOCKUP SOLENOID
CONTROLLER
TRANSMISSION RATIO CALCULATING SECTION
(PA)
(PR)
(Ps)
(D)
(iP)
(ωTR)
(TATF)
(VSP)
(ωIR)
(TVO)
(Ne)
1
2
2a
2b
2c
3
4
5
11
12
13
21
22
23
24
25
26
27

2c
2
(PR)
(PA)
(PP)
(PS)
13
11a
11
X
TO TORQUE CONVERTER RELEASE VALVE
FROM REGULATOR VALVE
21
THROTTLE OPENING SENSOR
(TVO)
22
IMPELLER ROTATION SPEED SENSOR
(ωIR)
23
TURBINE ROTATION SPEED SENSOR
(ωTR)
24
OIL TEMP. SENSOR
(TATF)
25
VEHICLE SPEED SENSOR
(VSP)
26
TRANSMISSION RATIO CALCULATING SECTION
(iP)
27
ENGINE ROTATION SPEED SENSOR
(Ne)
12
CONTROLLER
(D)

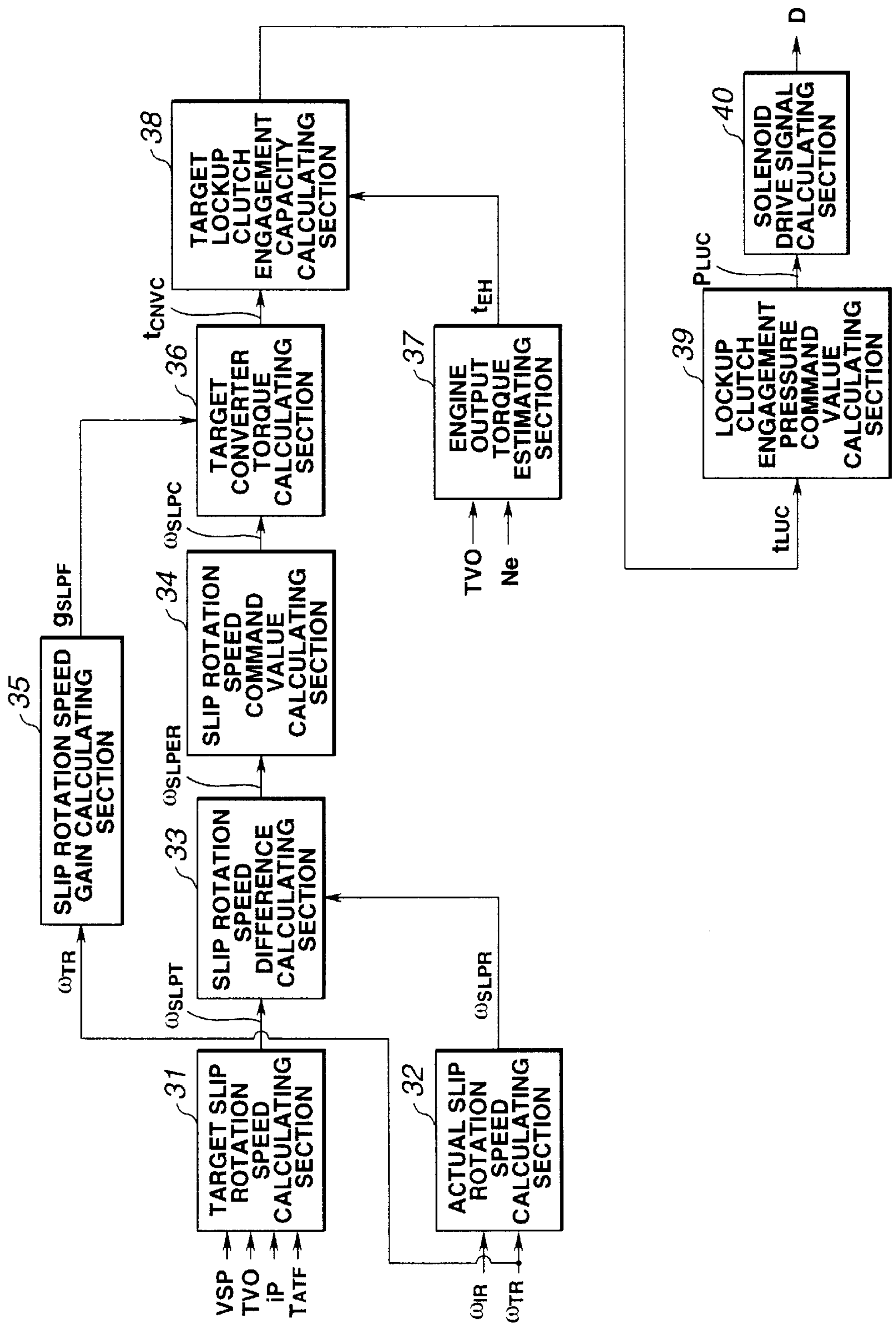
FIG.4
VSP
TVO
iP
TATF
31
TARGET SLIP ROTATION SPEED CALCULATING SECTION
ωIR
ωTR
32
ACTUAL SLIP ROTATION SPEED CALCULATING SECTION
ωTR
ωSLPT
ωSLPR
35
SLIP ROTATION SPEED GAIN CALCULATING SECTION
gSLPF
33
SLIP ROTATION SPEED DIFFERENCE CALCULATING SECTION
ωSLPER
34
SLIP ROTATION SPEED COMMAND VALUE CALCULATING SECTION
ωSLPC
36
TARGET CONVERTER TORQUE CALCULATING SECTION
tCNVC
38
TARGET LOCKUP CLUTCH ENGAGEMENT CAPACITY CALCULATING SECTION
TVO
Ne
37
ENGINE OUTPUT TORQUE ESTIMATING SECTION
tEH
tLUC
39
LOCKUP CLUTCH ENGAGEMENT PRESSURE COMMAND VALUE CALCULATING SECTION
PLUC
40
SOLENOID DRIVE SIGNAL CALCULATING SECTION
D

SLIP CONTROL APPARATUS FOR TORQUE CONVERTER

BACKGROUND OF THE INVENTION

The present invention relates to improvements in a slip control apparatus of a torque converter for an automatic transmission, and more particularly to a slip control apparatus which quickly converges a slip rotation speed between input and output elements of a torque converter to a target value according to a vehicle running condition.

Generally, a torque converter has merits such as a torque fluctuation absorbing function and a torque increasing function due to a fluid power transmission, although a transmission efficiency of the fluid power transmission is lower than that of a power transmission by means of a direct mechanical connection. In order to improve the transmission efficiency of the torque converter, most torque converters employ lockup clutches for directly connecting the input and output elements of the torque converter when the vehicle is put in a running condition where the torque fluctuation absorbing function or the torque increasing function are not required. However, such a torque converter with a lockup clutch, which is merely controlled between the lockup state (ON) and the converter state (OFF), has a limitation in a slip control range, and therefore it is difficult to further improve the transmission efficiency of a torque converter with this ON-OFF control type lockup clutch.

In order to solve the above-mentioned problems of the conventional ON-OFF lockup control type torque converter, various types of lockup torque converters have been proposed. For example, there is proposed a lockup torque converter arranged to set a slip control range upon ensuring the necessary and minimum torque fluctuation absorbing function and torque increasing function. Further, an art for controlling slippage of a torque converter according to a target slip rotation speed determined by a vehicle running condition is disclosed in a paper "Lock-up Clutch Slip Control System for Automatic Transmissions", which is written on pages 81 to 84 in a preprint for a scientific lecture meeting No. 954 in 1995–9 published by Japanese Society of Automotive Engineer. More particularly, in this art a target slip rotation speed is obtained from the throttle opening, a vehicle speed, and an oil temperature of the automatic transmission as an input. A lockup clutch engagement pressure command value (required engagement force for achieving the target slip rotation speed is directly obtained by means of the parameter identification method where the target slip rotation speed and the actual slip rotation speed are treated as an input and an output, in order to output a control signal corresponding to the engagement command value.

SUMMARY OF THE INVENTION

However, this conventional slip control system does not take account of the characteristic between the slip rotation speed and the lockup clutch engagement pressure command value including the engine output torque. Therefore, as shown in FIGS. 9A to 9E, when the target slip rotation speed $\omega_{SLPT}$ is decreased from 150 rpm to 70 rpm due to the decrease of a throttle opening TVO of an engine from 20° to 10° at a vehicle speed of 45 k/m, the change of the lockup clutch engagement pressure command value $P_{LUC}$ will delay as compared with the decrease of the target rotation speed $\omega_{SLPT}$. Therefore, the actual lockup clutch engagement pressure will be kept high, and the actual slip rotation speed $\omega_{SLPR}$ will become extremely small as compared with the target slip rotation speed $\omega_{SLPT}$ such that the lockup clutch tends to be put in an engaged state. In such a state, the slip rotation speed of the torque converter will be temporally short and generate shocks and noises.

It is therefore an object of the present invention to provide an improved slip control apparatus for a torque converter while solving the above-mentioned problem.

A slip control apparatus according to the present invention is for a torque converter with a lockup clutch. The slip control apparatus controls a slip rotation speed between input and output elements of the torque converter so as to be set at a slip rotation speed command value through the control of an engagement condition of the lockup clutch. The torque converter is connected to an engine and has a relationship between a converter torque and a slip rotation speed. The slip control apparatus comprises a target converter torque calculating section, a target lockup clutch engagement capacity calculating section and a lockup clutch engagement force controlling section. The target converter torque calculating section calculates a target converter torque for achieving the slip rotation speed command value on the basis of the relationship of the torque converter. The target lookup clutch engagement capacity calculating section calculates a target lockup clutch engagement capacity by subtracting the target converter torque from an output torque of the engine. The lockup clutch engagement force controlling section controls an engagement force of the lockup clutch so as to adjust a lockup clutch engagement capacity of the lockup clutch at the target lockup clutch engagement capacity.

BRIEF DESCRIPTION OF THE DRAWINGS

FIG. 4 is a block diagram showing the slip control executed by a controller according to the present invention.

DETAILED DESCRIPTION OF THE INVENTION

Referring to FIGS. 1 to 8E, there is shown an embodiment of a slip control apparatus for a torque converter in accordance with the present invention.

Figure 1:
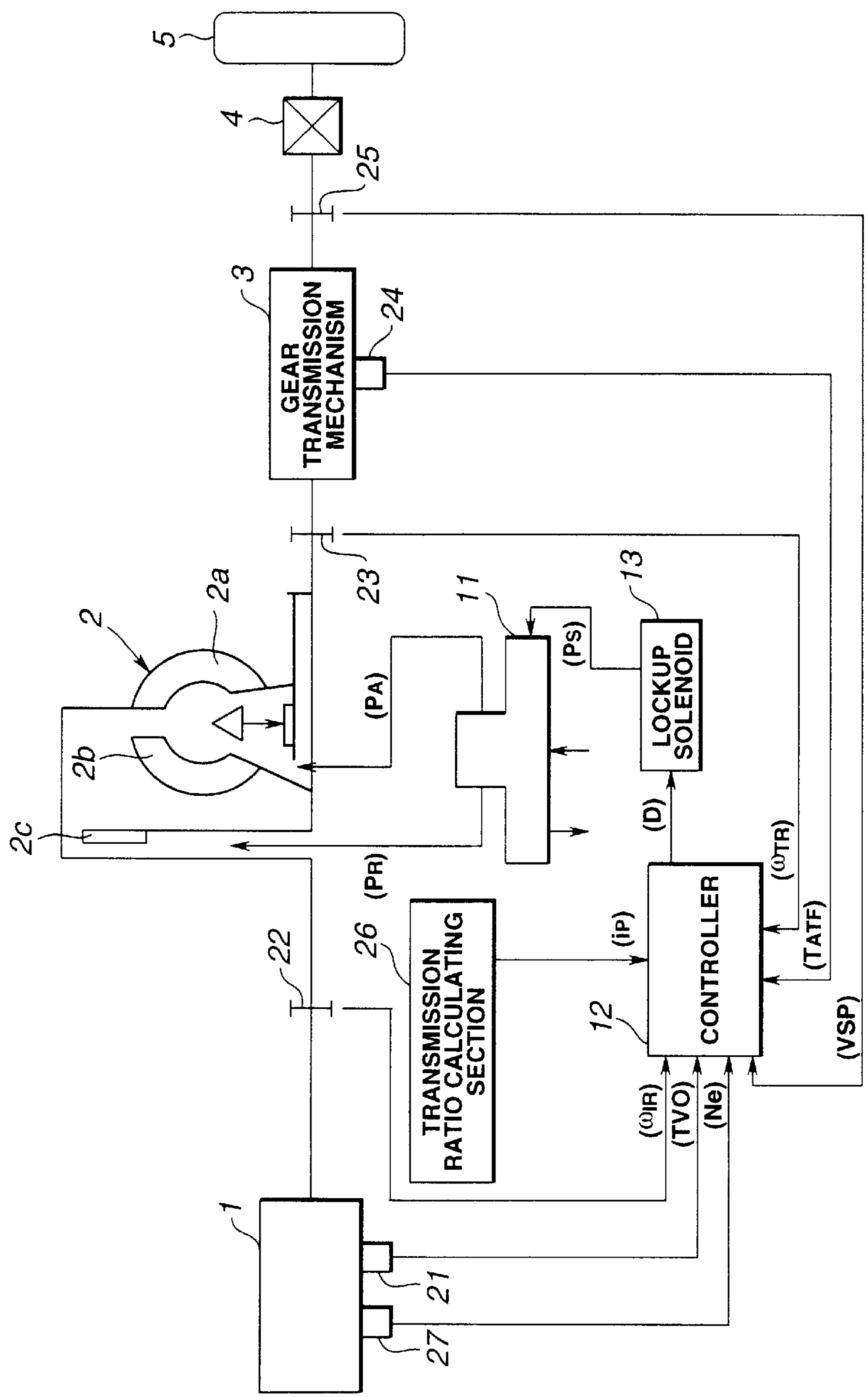
FIG. 1 is a schematic view of a drive system of a vehicle provided with a slip control apparatus of an embodiment according to the present invention.

FIG. 1 shows a drive system which includes a torque converter 2 equipped with the slip control apparatus according to the present invention. The drive system of a vehicle comprises an engine 1, the torque converter 2, a gear transmission mechanism 3 of an automatic transmission, a differential gear unit 4 and wheels 5 which are connected in order of mention, as shown in FIG. 1.

The torque converter 2 is of a lockup type and comprises a pump impeller 2$a$ functioning as an input element driven by the engine 1, a turbine runner 2$b$ functioning as an output element connected to an input shaft of the gear transmission mechanism 3, and a lockup clutch 2$c$ directly connecting the pump impeller 2$a$ and the turbine runner 2$b$.

An engagement force of the lockup clutch 2$c$ is determined by a difference (lockup clutch engagement pressure) between an apply pressure $P_A$ and a release pressure $P_R$. When the apply pressure $P_A$ is smaller than the release pressure $P_R$, the lockup clutch 2$c$ is put in a released condition so as not to directly connect the pump impeller 2$a$ and the turbine runner 2$b$. That is, under this pressure balance, the torque converter 2 is put in a converter state where the slip between the pump impeller 2$a$ and the turbine runner 2$b$ is not limited. When the apply pressure $P_A$ is greater than the release pressure $P_R$ and when the difference therebetween (lockup clutch engagement pressure) is smaller than a predetermined value, the lockup clutch 2$c$ is slippingly engaged according to the difference such that the torque converter 2 is operated in a slip control state where the slip rotation speed of the torque converter 2 is controlled according to the engagement force of the lockup clutch 2$b$. When the difference is greater than the predetermined values the torque converter 2 is put in a lockup state where a relative rotation between the pump impeller 2$a$ and the turbine runner 2$b$ becomes zero.

Therefore, when the torque converter 2 is put in the slip control state. the torque converter 2 transfers torque corresponding to the sum of a converter torque and a lockup clutch engagement capacity. The converter torque is a fluid transmission caused by the relative rotation between the pump impeller 2$a$ and the turbine runner 2$b$ through fluid, and the lockup clutch engagement is a mechanical transmission by means of the lockup clutch 2$c$. The sum of the converter torque and the lockup clutch engagement capacity equals to the engine output torque.

The inventors of the present invention found from the relationship between the lockup clutch engagement capacity and the engine output torque that the lockup clutch engagement pressure could be obtained by subtracting the converter torque from the engine output torque. Further, they found by research that the converter torque could be previously obtained as a relationship between the slip rotation speed and the turbine rotation speed by each torque converter from the torque converter power transmission performance. On the basis of this research, the inventors proposed a new slip control system of a torque converter which system enables the calculation of the lockup clutch engagement capacity for realizing a target slip rotation speed.

Hereinafter, the relationship among the converter torque, the slip rotation speed and the turbine rotation speed which are obtained from the power-transmission performance of the torque converter will be discussed.

Figure 5:
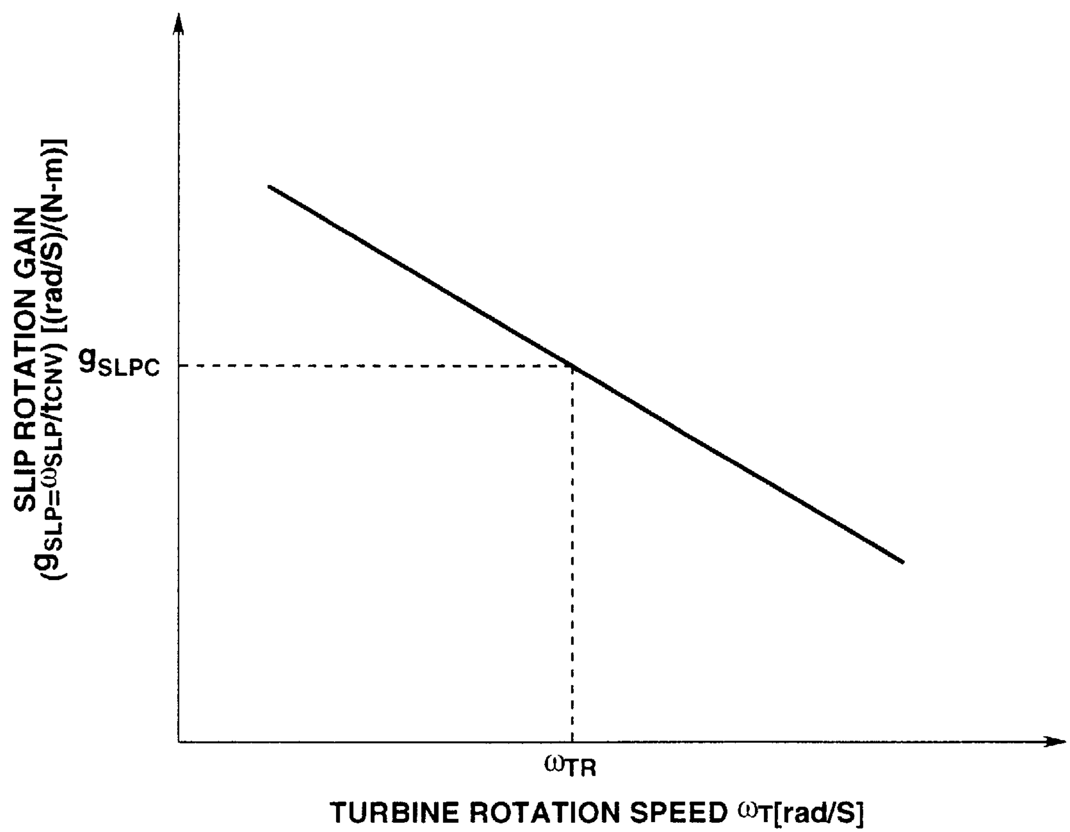
FIG. 5 is a graph which shows a relationship between a turbine rotation speed of a torque converter and a slip rotation speed gain.

It was defined that a slip rotation speed gain $g_{SLP}$ was a ratio of the slip rotation speed $\omega_{SLP}$ with respect to the converter torque $t_{CNV}$ as shown in FIG. 5 and as follows:

$$g_{SLP}=\omega_{SLP}/t_{CNV} \tag{1}$$

It was confirmed that the slip rotation speed gain $g_{SLP}$ changed according to the turbine rotation speed $\omega_T$ as shown in FIG. 5. The slip rotation speed gain $g_{SLP}$ may be set constant regardless of the turbine rotation speed $\omega_T$ by each torque converter.

Figure 2:
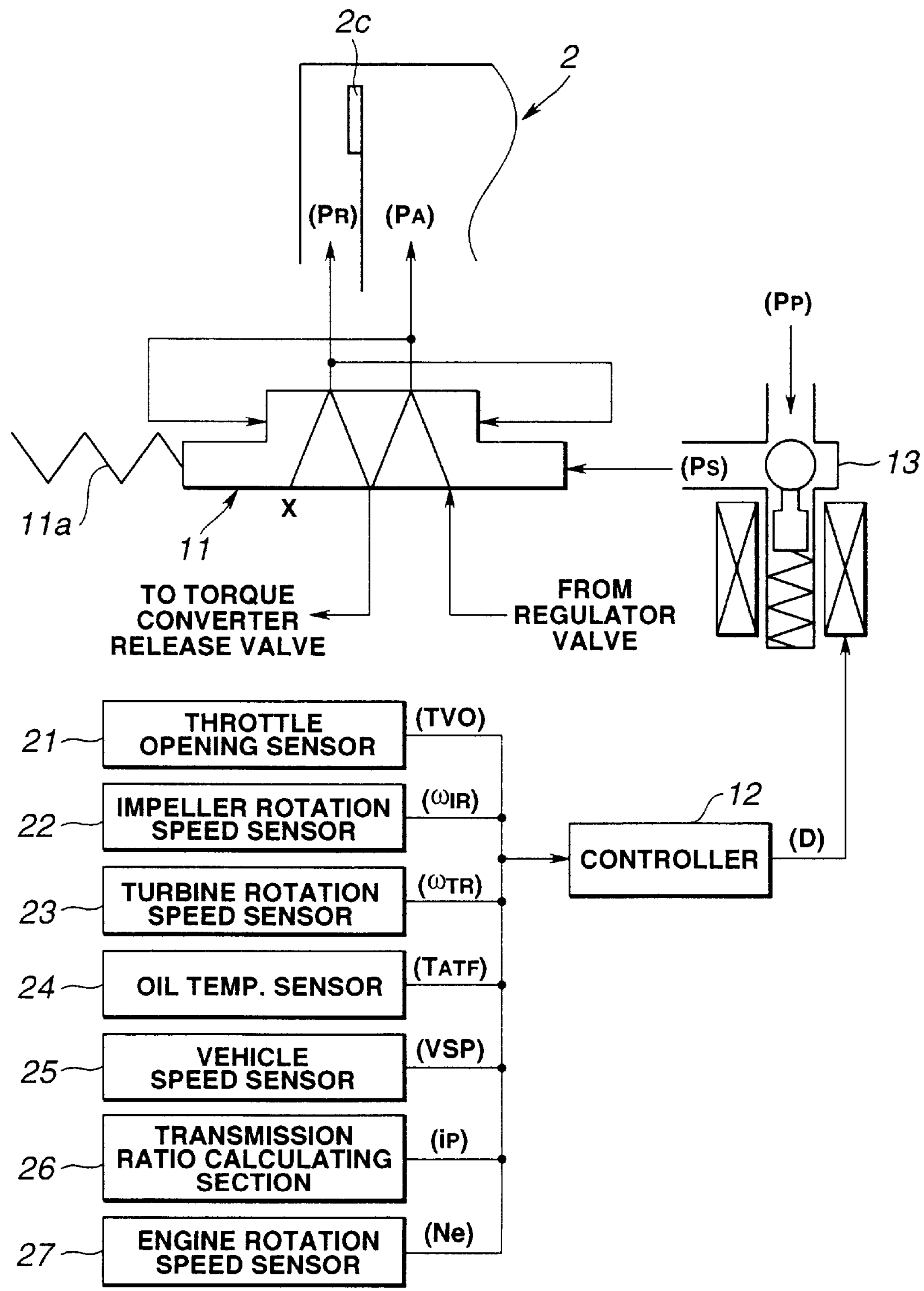
FIG. 2 is a schematic view of a slip control system of a torque converter of FIG. 1.

In the embodiment according to the present invention, in order to execute a predetermined slip control on the basis of the above mentioned principle, the slip control system for determining the apply pressure $P_A$ and the release pressure $P_R$ is constructed as follows:

As shown in FIGS. 1 and 2, a slip control valve 11 is arranged to determine the apply pressure $P_A$ and the release pressure $P_R$ according to a signal pressure $P_S$ outputted from a lockup solenoid 13 duty-controlled by a controller 12. The slip control valve 11 and the lockup solenoid 13 are of a conventional type. That is, the lockup solenoid 13 is arranged to increase the signal pressure $P_S$ according to the increase of the solenoid drive duty D applied from the controller 12 while employing the pilot pressure as a base pressure.

Figure 3:
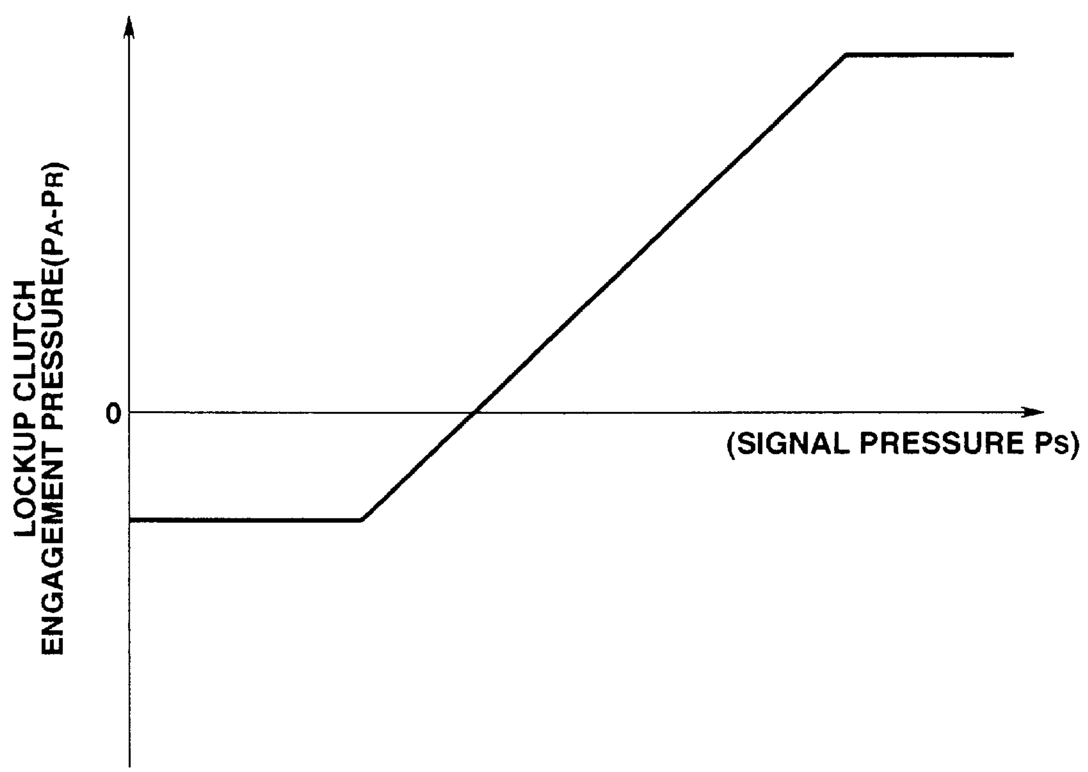
FIG. 3 is a graph which shows a relationship between a signal pressure outputted from a lockup solenoid and a lockup clutch engagement pressure.

The slip control valve 11 receives the signal pressure $P_S$ and the feedback release pressure $P_R$ in the same direction and receives a spring force of a spring 11$a$ and the feedback apply pressure $P_A$ in an opposite direction opposite to the direction of the signal pressure $P_S$. The lookup clutch engagement pressure represented by a difference $(P_A-P_R)$ between the apply pressure $P_A$ and the release pressure $P_R$ is changed according to the change of the signal pressure $P_S$ as shown in FIG. 3.

When the lockup clutch engagement pressure $(P_A-P_R)$ takes a negative value, that is, when $P_R>P_A$, the torque converter 2 is put in the converter state. When the lockup clutch engage pressure $(P_A-P_R)$ takes a positive value, that is, when $P_A<P_R$, the engagement capacity of the lockup clutch 2$c$ is increased according to the increase of the positive value $(P_A-P_R)$ so as to increase the restriction of the slip rotation speed of the torque converter 2. Further, when the lockup clutch engagement pressure becomes greater than a predetermined value, the torque converter 2 is put in the lockup state.

As shown In FIGS. 1 and 2, the controller 12 receives a plurality of signals, such as a signal from a throttle opening sensor 21 for detecting a throttle opening TVO of the engine 1, a detection signal $\omega_{IR}$ from an impeller rotation speed sensor 22 for detecting a rotation speed $\omega_I$ of a pump impeller 2$a$, a detection signal $\omega_{TR}$ from a turbine rotation speed sensor 23 for detecting a rotation Speed $\omega_T$ of the turbine runner 2$b$, a detection signal from an oil temperature sensor 24 for detecting a working oil temperature $T_{ATF}$ of an automatic transmission, a calculation result from a transmission ratio calculating section 26 for calculating a transmission ratio 1, and a detection signal from an engine rotation speed sensor 27 for detecting an engine rotation speed Ne.

The controller 12 determines a drive duty ratio D of the lockup solenoid 13 by executing the calculations according to a functional block diagram of FIG. 4 on the basis of the above-mentioned input signals from the various sensors, in order to execute a predetermined slip control.

At a target slip rotation speed calculating section 31, the controller 12 determines a target slip rotation speed $\omega_{SLPT}$ on the basis of the vehicle speed VSP, the throttle opening TVO, the transmission ratio $i_P$, and the fluid temperature $T_{ATF}$. The target slip rotation speed $\omega_{SLPT}$ is a smallest value within a range in which no torque fluctuation and no noises are generated.

At an actual slip rotation speed calculating section 32, the controller 12 calculates an actual slip rotation speed $\omega_{SLPR}$ of the torque converter 2 by subtracting the detected rotation speed $\omega_{TR}$ of the turbine runner 2*b* from the detected rotation speed $\omega_{IR}$ of the pump impeller 2*a*.

At a slip rotation speed difference calculating section 33, the controller 12 calculates the slip rotation speed difference $\omega_{SLPER}$ between the target slip rotation speed $\omega_{SLPT}$ and the actual slip rotation speed $\omega_{SLPR}$ from the following equation (2) by each moment t.

$$\omega_{SLPER}(t)=\omega_{SLPT}(t)-\omega_{SLPR}(t) \qquad (2)$$

At a slip rotation speed command value calculating section 34, the controller 12 calculates a slip rotation speed command value $\omega_{SLPC}$ for adjusting the actual rotation speed $\omega_{SLPR}$ to the target slip rotation speed $\omega_{SLPT}$ by using the following equation (3).

$$\omega_{SLPC}(t)=K_F\cdot\omega_{SLPER}(t)+(K_I/S)\cdot\omega_{SLPER}(t) \qquad (3)$$

wherein $K_P$ is a proportion control constant, $K_I$ is an integral control constant, and S is a differential operator.

At a slip rotation speed gain calculating section 35, the controller 12 obtains the slip rotation speed gain $g_{SLPC}$ by retrieving a map corresponding a graph of FIG. 5 according to the turbine rotation speed detection value $\omega_{TR}$. In this embodiment, a value $g_{SLPF}$(t), which is obtained by flowing the slip rotation speed gain $g_{SLPC}$ through a low pass filter having a first order delay time constant $T_{SLP}$, is used as a slip rotation speed gain, in order to suppress the influence due to a high frequency and a radical change of the gain $g_{SLPC}$. The filtered value $g_{SLPF}$(t) is obtained from the following equation (4).

$$g_{SLPF}(t)=[1/(T_{SLP}\cdot S+1)]g_{SLPC}(t) \qquad (4)$$

This filter treated value $g_{SLPF}$(t) stabilizes the slip control by eliminating the influence due to a high frequency and a radical change of the gain $g_{SLPC}$.

At a target converter-torque calculating section 36, the controller 12 calculates a target converter torque $t_{CNVC}$ from the equation (5) which is obtained by replacing $g_{SLP}$ and $\omega_{SLP}$ with $g_{SLPF}$ and a slip rotation speed command value $\omega_{SLPC}$ in the equation (1). The target converter torque $t_{CNVC}$ is a target value for achieving the slip rotation speed command value $\omega_{SLPC}$ when the turbine rotation speed is $\omega_{TR}$.

$$t_{CNVC}(t)=\omega_{SLPC}(t)/g_{SLPT} \qquad (5)$$

Figure 6:
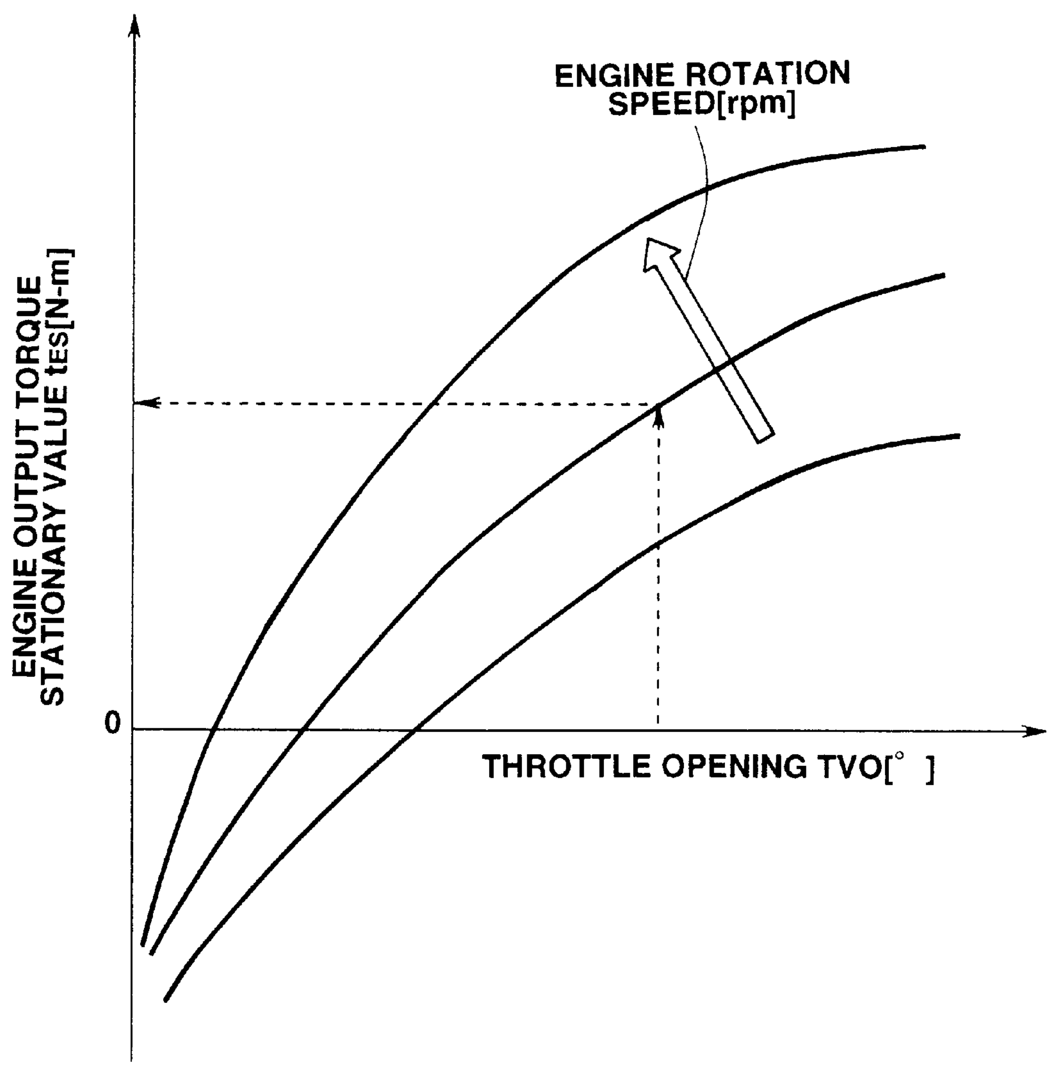
FIG. 6 is a graph which shows a relationship among a throttle opening, a rotation speed and an output torque of an engine.

At an engine output torque estimating section 37, the controller 12 retrieves a stationary value $t_{ES}$ of the engine output torque from a map corresponding to the graph shown in FIG. 6 indicative of characteristics of the engine 1. the engine rotation speed $N_e$ and the throttle opening TVO. Further, at the engine output torque estimating section 37, the controller 12 processes the obtained stationary value $t_{ES}$ by flowing it through a filter having a time constant $T_{ED}$ corresponding to a dynamic engine delay in order to obtain a further accurate value $t_{ES}$ so as to further finely approach the estimated value to the actual engine output torque. Such a filtering process is executed by the calculation of the following equation.

$$t_{EH}(t)=[1/(T_{ED}\cdot S+1)]t_{ES}(t) \qquad (6)$$

At a target lockup clutch engagement capacity calculating section 38, the controller 12 obtains a target lockup clutch engagement capacity $t_{LUC}$ by subtracting the target converter torque $t_{CNVC}$ from the estimated engine output torque $t_{EH}$ as follows:

$$t_{LUC}(t)=t_{ES}(t)-t_{CNVC}(t) \qquad (7)$$

Figure 7:
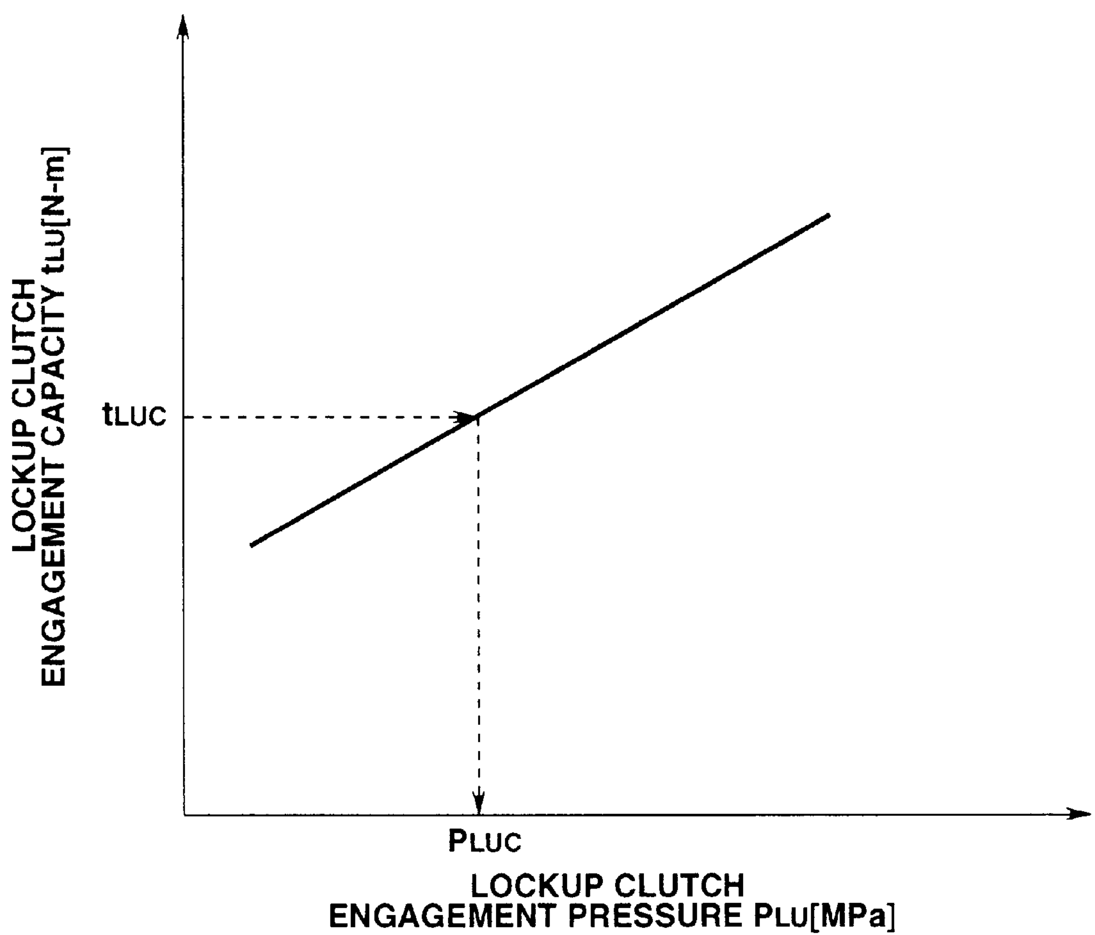
FIG. 7 is a graph which shows a relationship between the engagement pressure and an engagement capacity of the lockup clutch.

At a lockup clutch engagement pressure command value calculating section 39, the controller 12 retrieves a lockup clutch engagement pressure command value $P_{LUC}$ for achieving the target lockup clutch engagement capacity $t_{LUC}$ for a map corresponding to the graph shown in FIG. 7. The relationship between the lockup clutch engagement pressure $P_{LU}$ and the lockup clutch engagement capacity $t_{LU}$ shown in FIG. 7 was previously obtained by each torque converter. Therefore, it is possible to retrieve the lockup clutch engagement pressure command value $P_{LUC}$ corresponding to the target lockup clutch engagement capacity $t_{LUC}$.

At a solenoid drive signal calculating section 40, the controller 12 determines a lockup solenoid drive duty D for setting the actual lockup clutch engagement pressure at the lockup clutch engagement pressure command value $P_{LUC}$ and outputs the determined lockup solenoid drive duty D to the lockup solenoid 13 shown in FIGS. 1 and 2.

The duty control of the lockup solenoid 13 is executed as follows:

The slip rotation speed gain $g_{SLP}$, which is a ratio of the slip rotation speed $\omega_{SLP}$ to the converter torque $t_{CNV}$, is previously obtained by each output rotation speed $\omega_T$ of the torque converter, and the slip rotation speed gain $g_{SLPC}$ is retrieved from the output rotation speed $\omega_{TR}$ of the torque converter at the slip rotation speed gain calculating section 35.

The target converter torque $t_{CNVC}$ for ensuring the slip rotation speed command value $\omega_{SLPC}$ is calculated at the calculating section 36 by dividing the slip rotation speed command value $\omega_{SLPC}$ by the slip rotation speed gain $g_{SLPC}$.

The target lockup clutch engagement capacity $t_{LUC}$ is calculated by subtracting the target converter torque $t_{CNVC}$ from the engine output torque $t_{EH}$. Then, the engagement force is controlled such that the lockup clutch engagement capacity is adjusted to the calculated lockup clutch engagement capacity $t_{LUC}$.

Figure 8A:
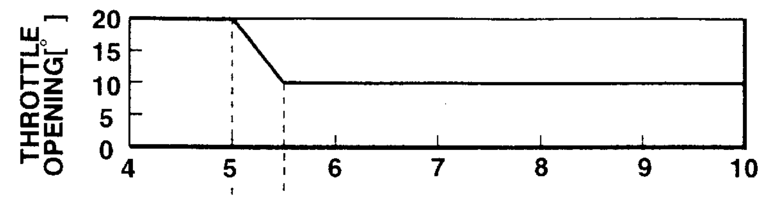
FIGS. 8A to 8E are time charts which show an operation ensured by the slip control according to the present invention.
Figure 8B:
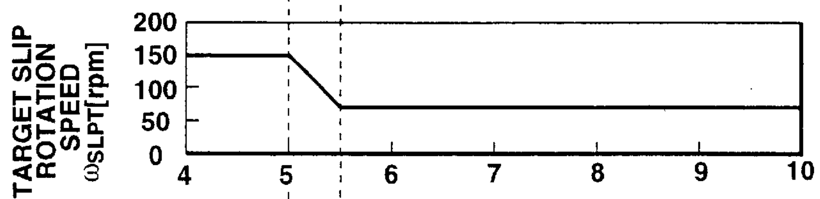
Figure 8C:
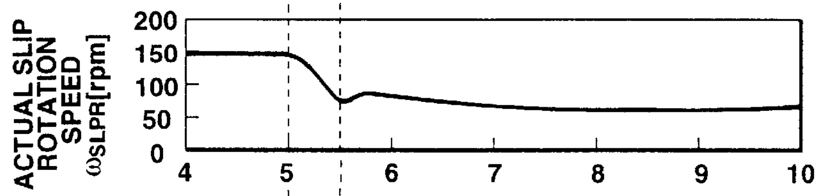
Figure 8D:
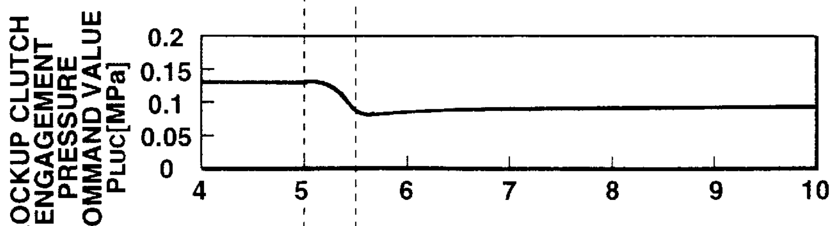
Figure 8E:
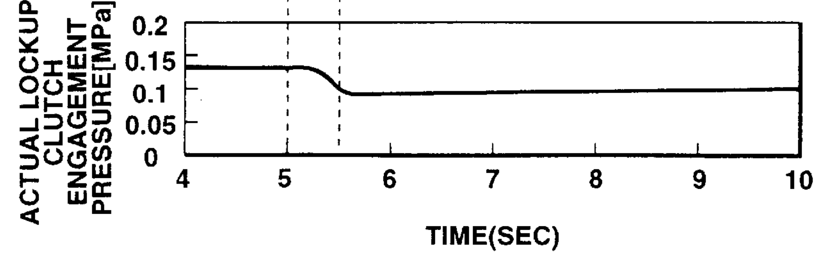
Figure 9A:
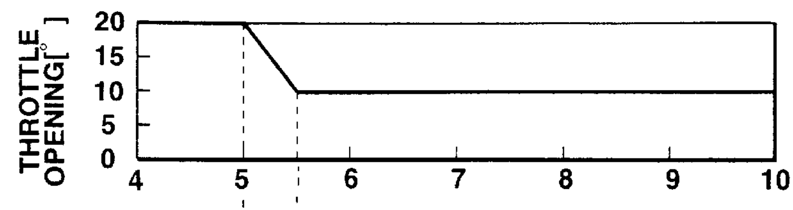
FIGS. 9A to 9E are time charts which show an conventional operation ensured by a convention slip control.
Figure 9B:
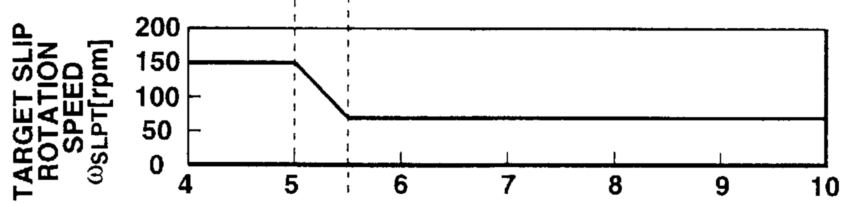
Figure 9C:
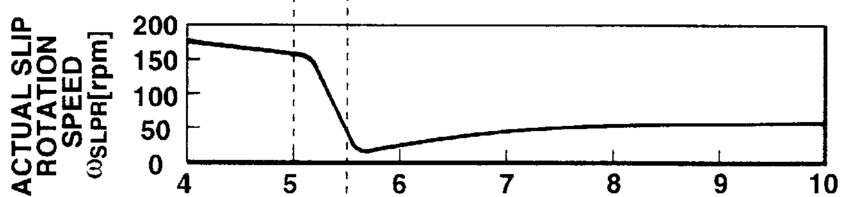
Figure 9D:
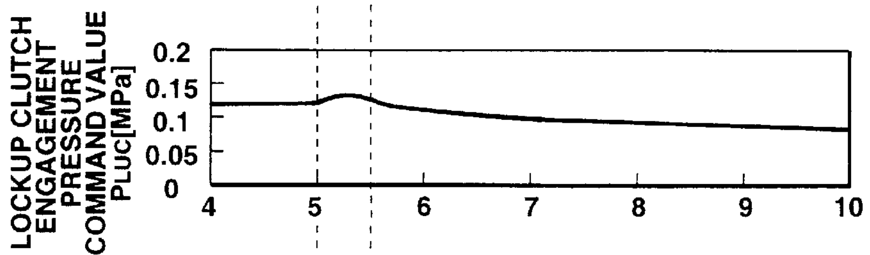
Figure 9E:
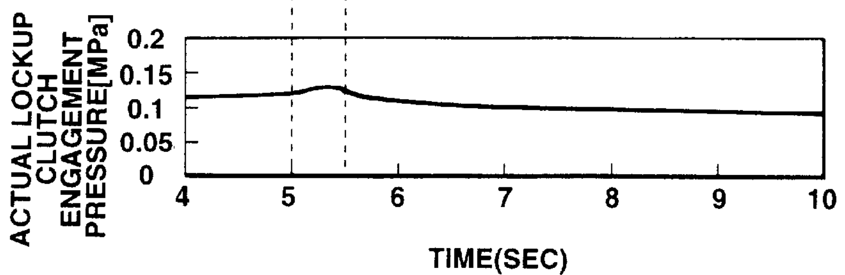

Therefore, the slip control for adjusting the torque converter slip rotation speed at the command value $\omega_{SLPC}$ is linearly compensated. Accordingly, the slip control according to the present invention ensures the following functional advantages:

That is, in case that the target slip rotation speed $\omega_{SLPT}$ is decreased from 150 rpm to 70 rpm by the decrease of the throttle opening TVO from 20° to 10° as shown in FIGS. 8A to 8E, the lockup clutch engagement pressure command value $P_{LUC}$ is decreased with no delay with respect to the decrease of the throttle opening TVO as shown in FIG. 8B. This prevents the problem that the actual lockup clutch engagement pressure is kept at a high value after the decrease of the throttle opening. Accordingly the actual slip rotation speed $\omega_{SLPR}$ generally follows the target rotation speed $\omega_{SLPT}$ as shown in FIG. 8C while avoiding the actual slip rotation speed $\omega_{SLPR}$ becomes too small as compared with the target rotation speed $\omega_{SLPT}$. Therefore, the slip control according to the present invention prevents the noises in the torque converter 2 from being generated by a temporal shortage of the slip rotation speed of the torque converter 2.

In the calculation of the target converter torque, the slip rotation speed gain may be set at a constant value which does not change even if the output rotation speed $\omega_T$ of the torque converter is changed, instead of the above-mentioned slip rotation speed gain $g_{SLF}$ which changes according to the change of the output rotation speed $\omega_T$ of the torque converter. This constant slip rotation speed gain will ensure the above mentioned advantages in some degree.

Since the slip rotation speed gain calculating section 35 is arranged to employ the slip rotation speed gain $g_{SLPF}$ which is obtained by flowing the slip rotation speed gain $g_{SLF}$ by the low pass filter, the filtered slip rotation speed gain $g_{SLPF}$ avoids a radical change even if the retrieved gain is radically or frequently changed, so as to prevent the degradation of the slip control.

Since the engine output torque estimating section 37 is arranged to estimate the engine output torque $t_{ES}$ on the basis of the map showing the relationship among the throttle opening TVO. the engine rotation speed $N_c$ and the output torque $t_{ES}$ as shown in FIG. 6 and from the throttle opening TVO and the engine rotation speed $N_c$, the target lockup clutch engagement capacity $t_{LUC}$ is corrected on the basis of the engine output torque. Therefore, the slip control is further finely executed.

Since the engine output torque estimating section 37 is arranged to filter the estimated engine output torque by means of the filter corresponding to the dynamic delay of the engine 1 and to output the estimated and filtered engine output torque, the estimation of the engine output torque is executed upon taking account of the dynamic delay of the engine 1. Therefore, the slip control is further finely executed.

With the thus arranged slip control apparatus according to the present invention, the slip control proceeds upon dividing the slip phenomenon of the torque converter into several blocks and reconstructing them into linear models. Therefore, the lockup clutch engagement force command value corresponding to the target slip rotation speed command value is obtained without generating troubles generated in the conventional apparatuses.

The contents of Application No. 9-240882, with a filing date of Sep. 9, 1997 in Japan, are hereby incorporated by reference.

What is claimed is:

1. A slip control apparatus of a torque converter with a lockup clutch, the slip control apparatus controlling a slip rotation speed between input and output elements of the torque converter at a slip rotation speed command value by controlling an engagement condition of the lockup clutch, the torque converter being connected to an engine and having a relationship between a converter torque and a slip rotation speed, the slip control apparatus comprising:

a target converter torque calculating section calculating a target converter torque for achieving the slip rotation speed command value on the basis of the relationship of the torque converter;

a target lockup clutch engagement capacity calculating section calculating a target lockup clutch engagement capacity by subtracting the target converter torque from an output torque of the engine; and a lockup clutch engagement force controlling section controlling an engagement force of the lockup clutch so as to adjust a lockup clutch engagement capacity of the lockup clutch at the target lockup clutch engagement capacity.

2. A converter slip control apparatus of a torque converter with a lockup clutch, the slip control apparatus controlling a slip rotation speed between input and output elements of the torque converter at a slip rotation speed command value by controlling an engagement condition of the lockup clutch, the torque converter being connected to an engine and having a relationship between a converter torque and a slip rotation speed, the slip control apparatus comprising:

a target converter torque calculating section calculating a target converter torque for achieving the slip rotation speed command value on the basis of the relationship of the torque converter;

a target lockup clutch engagement capacity calculating section calculating a target lockup clutch engagement capacity by subtracting the target converter torque from an output torque of the engine; and a lockup clutch engagement force controlling section controlling an engagement force of the lockup clutch so as to adjust a lockup clutch engagement capacity of the lockup clutch at the target lockup clutch engagement capacity, wherein the relationship of the torque converter is previously stored in the form of a ratio of slip rotation speed to the converter torque by each output rotation speed to the torque converter, the slip rotation speed gain being determined according to the relationship and the output rotation speed of the torque converter, the target converter torque being calculated on the basis of the slip rotation speed command value and the slip rotation speed gain.

3. A slip control apparatus of a torque converter with a lockup clutch, the slip control apparatus controlling a slip rotation speed between input and output elements of the torque converter at a slip rotation speed command value by controlling an engagement condition of the lockup clutch, the torque converter being connected to an engine and having a relationship between a converter torque and a slip rotation speed, the slip control apparatus comprising:

a target converter torque calculating section calculating a target converter torque for achieving the slip rotation speed command value on the basis of the relationship of the torque converter;

a target lockup clutch engagement capacity calculating section calculating a target lockup clutch engagement capacity by subtracting the target converter torque from an output torque of the engine; and a lockup clutch engagement force controlling section controlling an engagement force of the lockup clutch so as to adjust a lockup clutch engagement capacity of the lockup clutch at the target lockup clutch engagement capacity, wherein the relationship of the torque converter is previously stored in the form of a slip rotation speed gain which is a ratio of the slip rotation speed to the converter torque, the target converter torque being obtained by dividing the slip rotation speed command value by the slip rotation speed gain that is treated by a low-pass filter, the target converter torque being calculated by using the filtered slip rotation speed gain.

4. A slip control apparatus of a torque converter with a lockup clutch, the slip control apparatus controlling a slip rotation speed between input and output elements of the torque converter at a slip rotation speed command value by controlling an engagement condition of the lockup clutch, the torque converter being connected to an engine and having a relationship between a converter torque and a slip rotation speed, the slip control apparatus comprising:

a target converter torque calculating section calculating a target converter torque for achieving the slip rotation speed command value on the basis of the relationship of the torque converter;

a target lockup clutch engagement capacity calculating section calculating a target lockup clutch engagement capacity by subtracting the target converter torque from an output torque of the engine; and a lockup clutch engagement force controlling section controlling an engagement force of the lockup clutch so as to adjust a lockup clutch engagement capacity of the lockup clutch at the target lockup clutch engagement capacity, wherein the relationship of the torque converter is previously stored in the form of a slip rotation speed gain which is a ratio of the slip rotation speed to the converter torque by each output rotation speed of the torque converter, the slip rotation speed gain being determined according to the relationship and the output rotation speed of the torque converter, the target converter torque being determined by dividing the slip rotation speed command value by the retrieved slip rotation speed gain that is treated by a low-pass filter, the target converter torque being calculated by using the filtered slip rotation speed gain.

5. A slip control apparatus as claimed in claim 1, wherein a relationship among a drive load, a rotation speed and an output torque of the engine is previously obtained, the output torque of the engine being estimated from the relationship of the engine, the drive load and the rotation speed, the estimated engine output torque being used to calculate the target lockup clutch engagement capacity.

6. A slip control apparatus as claimed in claim 4, wherein the engine output torque is treated by a filter corresponding to a dynamic delay of the engine, the target lockup clutch engagement capacity being calculated by using the filtered engine output torque.

7. A slip control apparatus for a torque converter with a lockup clutch, the torque converter having an input element connected to an engine, an output element connected to an automatic transmission and a lockup clutch, said slip control apparatus comprising:

a throttle opening sensor detecting a throttle opening of the engine;

an engine rotation speed sensor detecting a rotation speed of the engine;

a converter input element rotation speed detector detecting a rotation speed of the input element of the torque converter;

a converter output element rotation speed detector detecting a rotation speed of the output element of the torque converter;

an actuator controlling a lockup clutch engagement pressure of the lockup clutch according to a control signal; and a controller storing first data indicative of a relationship between a converter torque and a slip rotation speed of the torque converter and second data indicative of a relationship among an engine output torque, the throttle opening and the engine rotation speed, said controller being arranged to determine a target converter torque for achieving a command value of the slip rotation speed from the first data and the slip rotation speed command value, to determine the engine output torque from the second data, the throttle opening and the engine rotation speed, to calculate a target lockup clutch engagement capacity by subtracting the target converter torque from the engine output torque of an engine and to output the control signal corresponding to the target lockup clutch engagement capacity to said actuator.

8. A converter slip control apparatus comprising:

a torque converter comprising an input element connected to an engine, an output element connected to a gear transmission mechanism of an automatic transmission and a lockup clutch through which a connecting condition between the input and output element are controlled, said torque converter performing a relationship between a converter torque and a slip rotation speed, the lockup clutch changing lockup clutch engagement capacity according to a change of an engagement force thereof;

a target converter torque determining means for determining a target converter torque for adjusting the slip rotation speed at a command value from the relationship of said torque converter and the command value of the slip rotation speed;

a target lockup clutch engagement capacity determining means for determining a target lookup clutch engagement capacity by subtracting the target converter torque from an output torque of the engine; and a lockup clutch engagement controlling means for controlling an engagement force of the lockup clutch so as to adjust the lockup clutch engagement capacity at the target lockup clutch engagement capacity.

9. A converter slip control apparatus comprising:

a torque converter comprising an input element connected to an engine, an output element connected to a gear transmission mechanism of an automatic transmission and a lockup clutch through which a connecting condition between the input and output element are controlled, said torque converter performing a relationship between a converter torque and a slip rotation speed, the lockup clutch changing lockup clutch engagement capacity according to a change of an engagement force thereof;

a target converter torque determining means for determining a target converter torque for adjusting the slip rotation speed at a command value from the relationship of said torque converter and the command value of the slip rotation speed;

a target lockup clutch engagement capacity determining means for determining a target lockup clutch engagement capacity by subtracting the target converter torque from an output torque of the engine; and a lockup clutch engagement controlling means for controlling an engagement force of the lockup clutch so as to adjust the lockup clutch engagement capacity at the target lockup clutch engagement capacity, wherein the relationship of said torque converter is represented in the form of a ratio of the slip rotation speed to the converter torque, the ratio being determined by each output rotation speed of said torque converter.

10. A converter slip control apparatus as claimed in claim 8, wherein a relationship among a drive load, a rotation speed and an output torque of the engine is previously obtained, the output torque of the engine being estimated from the relationship of the engine, the drive load and the rotation speed, the target lockup clutch engagement capacity being calculated from the estimated engine output torque and the target converter torque.

11. A converter slip control apparatus as claimed in claim 8, wherein the lockup clutch sets said torque converter into one of a lockup state, a converter state and a slip control state according to the controlled engagement force.

12. A converter slip control apparatus as claimed in claim 8, wherein a lockup clutch engagement controlling means outputs a duty value corresponding to the lockup clutch engagement force to a lockup solenoid connected to a pressure control valve through which the lockup clutch engagement force is controlled.

13. A converter slip control apparatus as claimed in claim 1, wherein the relationship of the torque converter is previously stored in the form of a slip rotation speed gain which is a ratio of the slip rotation speed to the converter torque, the target converter torque being calculated on the basis of the slip rotation speed command value and the slip rotation speed gain.

* * * * *